Aug. 25, 1953  S. F. WALKER  2,650,180
INSULATING DEVICE FOR PIPES, FAUCETS, AND THE LIKE
Filed July 5, 1951
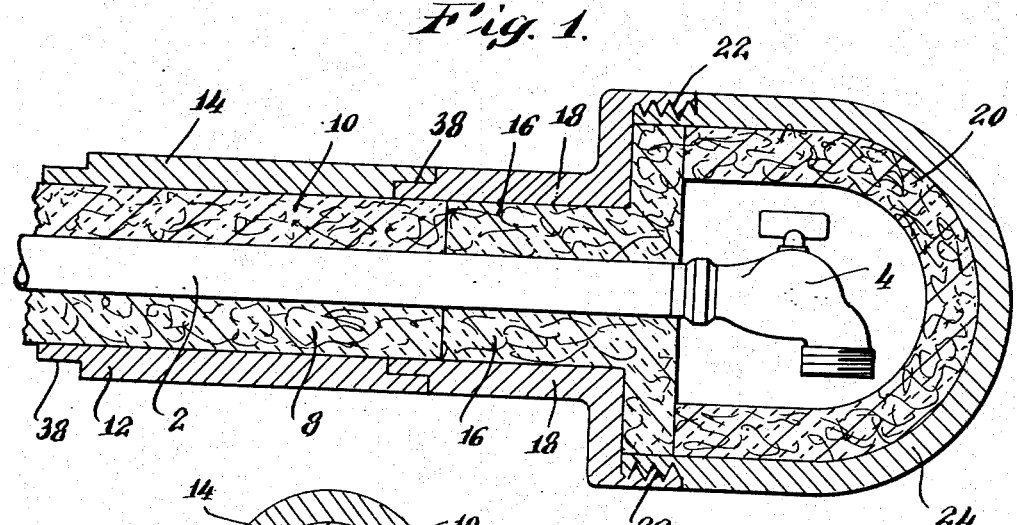
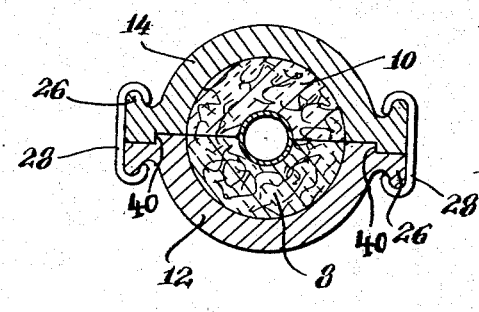
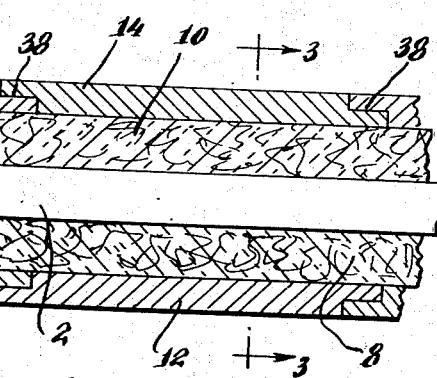
INVENTOR.
Stanley F. Walker
BY
ATTORNEY.

Patented Aug. 25, 1953

2,650,180

UNITED STATES PATENT OFFICE 2,650,180

INSULATING DEVICE FOR PIPES, FAUCETS, AND THE LIKE

Stanley F. Walker, Montgomery, Ala.

Application July 5, 1951, Serial No. 235,316

3 Claims. (Cl. 154—44)

The present invention relates to improvements in cold insulating devices and, more specifically, to devices for preventing the freezing of water in plumbing equipment such as pipes, faucets, and the like.

One object of the present invention is the provision of a device of the character described which can be attached easily and quickly to those parts of a plumbing system which are exposed to the danger of freezing during the winter season, as for instance to pipes and faucets outdoors or in unheated parts of buildings, and which can be removed therefrom partially or entirely, easily and quickly, and without exposing the operator to the danger of cutting his fingers on sharp edges of dove-tail connections or the like, for making faucets and the like accessible at the end of the cold season, or for inspection or maintenance purposes.

Another object of the present invention is the provision of a device of the character described which will safely protect all kinds of piping, irrespective of whether it is straight, angular, T-shaped, curved, or the like, from freezing damage without requiring that parts of the installation be changed or removed and reinstalled.

A further object of the present invention is the provision of a device of the character described which is simple in construction and comparatively inexpensive, but which is also durable, vermin-proof, sturdy, and of a pleasing outer appearance.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred forms of the invention have been shown.

In said drawing:

Figure 1 is a longitudinal sectional view of a preferred embodiment of my invention as it appears in connection with a straight pipe and a faucet;

Fig. 2 is a sectional view of Fig. 1 of a so-called elbow pipe; and,

Fig. 3 is a cross sectional view on the line 3—3 of Fig. 2.

Similar reference characters refer to similar parts throughout the several views.

In the drawing the numeral 2 denotes a straight pipe to one end of which is secured a faucet 4. The straight pipe 2 may be connected at its other end to an elbow pipe 6 or the like, and is encompassed by heat and cold insulation material such as fiberglass or the like, which preferably is made as pairs of shells 8 and 10 that are semi-circular in cross section. Said insulation is interposed between the outer side of the pipe 2 and the inner side of a casing which preferably consists of one or more pairs of shells 12 and 14 of plastic material or the like, which are semi-circular in cross section. The end portion of the pipe 2 adjoining the faucet 4 preferably is encompassed by an insulation 16, which may be made as a pair of shells or which may be stuffed into a flanged casing member 18 after the same has been installed. The faucet 4 preferably is surrounded by a dome-shaped cap 20 of insulating material, whose innerside is in spaced relation to the faucet 4. As may be seen in Fig. 1, the casing 18 has a cylindrical portion adjoining the shells 12 and 14, and an outwardly flanged portion whose inner side is provided with a thread 22, or which in any other manner is adapted for attaching thereto detachably a dome-shaped cap 24 of plastic material or the like surrounding the insulation cap 20. If the inner diameter of the cylindrical portion of the casing 18 is large enough for sliding it over the faucet 4, the casing 18 can be made of one piece, otherwise it is made preferably as a pair of shells.

The shells 12 and 14 of each pair of shells can be held together by any suitable means. However, I prefer to carry out this feature of my invention in the manner shown in Fig. 3, where it will be seen that each shell is provided at each of its sides with a longitudinal outwardly extending flange portion 26 which is rounded at its edges and forms a groove along the main portion of the shell, and said groove is semi-circular in cross-section. C-shaped clamp members 28 of plastic material, metal, or the like engage said grooves in the manner shown in Fig. 3 and hold the pairs of shells 12 and 14 together. I have found that this arrangement is highly practical and economical, that it holds the pairs of shells tightly together because the clamp members 28 always are somewhat resilient, irrespective of whether they are made of plastic material or metal, and that this arrangement allows a dismantling to be done easier and faster than if the pairs of shells were connected to each other in the usual manner by means of screws and nuts or the like; which usually rust right after they have been exposed to the elements for any length of time. After the casings have been dismantled for repair or inspection purposes of the pipe, or the like, they can be reassembled more easily and quickly than would be the case with ordinary screw connections.

The insulation as well as the casings obviously will have to be shaped according to the shape of the piece of pipe which they are to encompass. For instance, for the elbow pipe 6, the insulating shells 30 and 32 and the casing shells 34 and 36 are elbow-shaped, or, for a T-piece pipe they are T-shaped, etc.

The extremities 38 of the adjoining parts 12, 14, 18, 34 and 36 preferably are stepped, so that the adjoining casings interlock with each other. I prefer also to make the adjoining sections of the straight edge portions of the shells stepped as at 40 (Fig. 3), so that the shells of each pair of shells are interlocked with each other.

The shells 34 and 36 are held together by the same flanged and grooved edge and clamp arrangement as is shown in Fig. 3 for the shells 12 and 14.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A device of the character described comprising a plurality of pairs of shell members each of which has a main portion that is substantially semi-circular in cross section and has at both sides outwardly extending longitudinal flange portions each of which is provided adjacent said main portion with a longitudinal groove which is semi-circular in cross-section and the edge sections of said flange portion adjacent said groove being rounded, resilient clamps engaging said grooves of each pair of said shell members and holding the latter together so that each pair of said shell members is adapted for encompassing a portion of a pipe, and insulating material interposed between the outer side of the pipe and the inner sides of said shell members.

2. A device of the character described comprising a plurality of pairs of shell members each of which has a semi-circular main portion and has at both sides outwardly from said main portion extending flange portions each of which is provided adjacent said main portion with a longitudinal groove which is semi-circular in cross-section and the edge sections of said flange portion adjacent said groove are rounded, resilient C-shaped members engaging said grooves of each pair of said shell members and holding the latter together so that each pair of said shell members is adapted for encompassing a portion of a pipe, and insulating material interposed between the outer side of the pipe and the inner sides of said shell members, each pair of shell members having its ends interlocked with the ends of adjoining pairs of shell members, and each shell member having its longitudinal edge portions interlocked with the edge portions of the other shell members of each pair of shell members.

3. A device of the character described comprising a plurality of first casings consisting of pairs of shell members each of which has a main portion that is substantially semi-circular in cross-section and has at both sides outwardly extending longitudinal flange portions each of which is provided adjacent said main portion with a longitudinal groove which is semi-circular in cross-section and the edge sections of said flange portions adjacent said groove being rounded, a second casing one end of which is interlocked with an end of one of said first casings while its other end is provided with an increased flange portion, a dome-shaped cap member detachably secured to the flange portion of said second casing being adapted for encompassing a faucet, resilient clamps engaging said grooves of the shell members of said first casing and holding the same together so that each pair of said shell members is adapted for encompassing a portion of a pipe, and insulating material being provided at the inner sides of said casings and of said cap member, said shell members having their ends interlocked with the ends of adjoining pairs of shell members, and each shell member having its longitudinal flange portions interlocked with the flange portions of the other shell member of each pair of shell members.

STANLEY F. WALKER.

References Cited in the file of this patent

UNITED STATES PATENTS

| Number | Name | Date |
| --- | --- | --- |
| 624,770 | Eibee | May 9, 1899 |
| 631,867 | Beaver | Aug. 29, 1899 |
| 633,607 | O'Malley | Sept. 26, 1899 |
| 2,324,181 | Tulien | July 13, 1943 |
| 2,532,587 | Williamson | Dec. 5, 1950 |

FOREIGN PATENTS

| Number | Country | Date |
| --- | --- | --- |
| 12,994 | Great Britain | Sept. 26, 1887 |